United States Patent [19]

Nix

[11] 3,881,768
[45] May 6, 1975

[54] PICKUP TRUCK BED LINER AND PROTECTOR

[76] Inventor: Edwin Lee Nix, 733 Tahlena Ave., Madison, Tenn. 37115

[22] Filed: Aug. 10, 1973

[21] Appl. No.: 387,459

[52] U.S. Cl. ............................. 296/39 R; 296/57 R
[51] Int. Cl. ............................................ B62d 33/02
[58] Field of Search ..... 296/28 D, 31 P, 39 R, 57 R

[56] References Cited
UNITED STATES PATENTS

| | | | |
|---|---|---|---|
| 2,898,146 | 8/1959 | Yudenfreund | 296/39 R |
| 3,170,714 | 2/1965 | Stalker | 296/37 R X |
| 3,480,321 | 11/1969 | Brandt et al. | 296/28 D |
| 3,578,375 | 5/1971 | Finefrock | 296/39 R |
| 3,653,710 | 4/1972 | Barnard | 296/39 R |
| D224,219 | 7/1972 | Ritter | 296/39 R X |

FOREIGN PATENTS OR APPLICATIONS

| | | | |
|---|---|---|---|
| 1,260,708 | 4/1961 | France | 296/39 R |
| 862,378 | 3/1961 | United Kingdom | 296/39 R |

Primary Examiner—Albert J. Makay
Assistant Examiner—Leslie J. Paperner
Attorney, Agent, or Firm—Gustave Miller

[57] ABSTRACT

This is a pickup truck bed liner and protector, self contained and molded in a single piece complementary to the bed of a pickup truck, and includes portions complementary to the bottom of the truck bed and to the tailgate, the front and side wall as well as to any wheel wells or gasoline filler pipe recess that may be present.

Further, there are also outwardly extending top edge protecting flanges on the front and side wall portions and also the tailgate portion. The bottom of the tailgate portion is integrally connected by a slightly indented web portion extending from the rear of the bed bottom so that it may hinge with the truck tailgate, the ends of the tailgate portion being disconnected from the side walls. In addition, upstanding ridges parallel to each other and to the side walls are provided in the bed bottom portion to enhance the cushioning effect of the material, which material may be of suitable plastic or fiberglass or other suitable material that may be vacuum molded to the desired shape. A frame rib upstanding about the tailgate portion provides a cushioning effect to any article that may contact there with. It may be inherently colored as desired to match the color of the particular pickup truck on which it is to be used. It serves as a protector for the interior of the pickup truck bed and keeps it undamaged and new looking for a very long period of time.

4 Claims, 4 Drawing Figures

PATENTED MAY 6 1975          3,881,768

PICKUP TRUCK BED LINER AND PROTECTOR

BACKGROUND OF THE INVENTION

Many pickup trucks are used today by owners who have occasional use for a truck body and also use for a family car. When such a pickup truck is used for truck use, the truck bed usually becomes soiled and scratched, making the pickup truck unsightly for use as a family car, and thus necessitating refinishing of the truck bed and body at substantial expense in order to retain a suitable appearance for use as a family car. It is to eliminate this refinishing expense that this invention is provided for, so as to keep the new appearance for the truck bed, by protecting it with the liner of this invention to protect the original finish.

OBJECTS OF THIS INVENTION

It is an object of this invention to provide a pickup truck bed protector that will make it possible to retain the new look and appearance through a great deal of use as a truck.

A further object of this invention is to provide a pickup truck bed protector that will enhance the appearance of the truck bed and body for an indefinite period, that will protect the body against damage and against paint scratches even during extensive truck use.

A further object of this invention is to provide a truck bed liner and protector that may be molded to exactly fit in the truck portion and protect the same, and that may be made in different colors, so that one may be selected to exactly match the color of a particular pickup truck.

A further object of this invention is to provide a readily removable pickup truck bed liner and protector that may be easily removed and replaced as desired.

A further object of this invention is to provide a bed liner or protector that is particularly made for use in a pickup truck and is an improvement over liners shown in U.S. Pat. Nos. 2,791,463; 2,898,146; 2,911,253; 3,578,375; 3,653,710, as well as in any other prior art.

BRIEF DESCRIPTION OF THE FIGURES

With the above and related objects in view, this invention consists in the details of construction and combination of parts, as will be more fully understood from the following description, when read in conjunction with the accompanying drawings, in which.

DETAILED DESCRIPTION OF THE INVENTION

Figure 1:
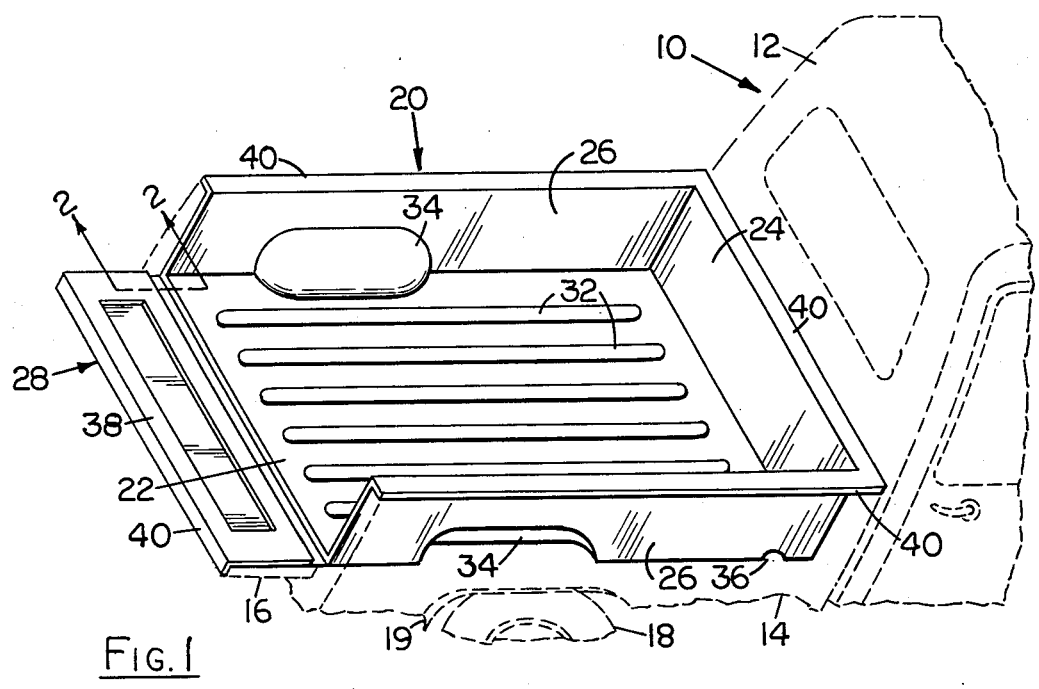
FIG. 1 is a perspective view of the pickup truck bed liner of this invention shown as in use.
Figures 2, 3:
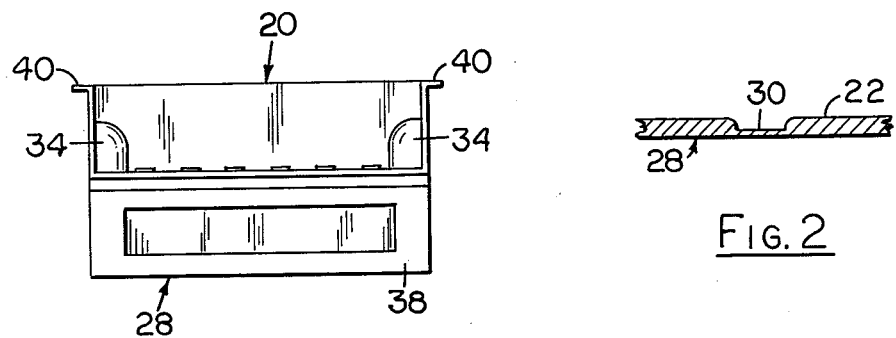
FIG. 2 is a section on line 2—2 of FIG. 2, showing the integral hinge connection between the liner tailgate panel and the liner bed bottom.
FIG. 3 is a rear end view of the invention with the tailgate portion in open position.
Figure 4:
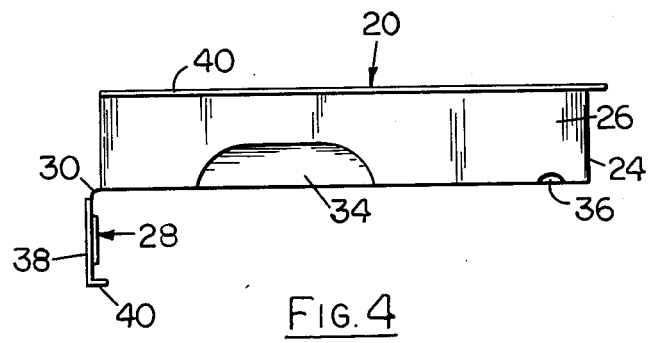
FIG. 4 is a side view of the liner.

There is shown at 10 in phantom outline a conventional pickup truck having the usual cab 12 which often serves as a family car and a truck body portion 14 which occasionally serves for trucking purposes, such a pickup truck having the usual other parts, including a tailgate 16, wheels 18, wheel fenders 19, and a gas tank filler pipe.

Such pickup trucks 10 often serve both as a family car and as a light truck, and to keep it in such clean and neat and new appearance so that it may continue to be used as a family car, the bed liner and protector 20 of this invention is provided. This liner 20 is molded of fiberglass, suitable plastic or other suitable material that is necessarily as rigid as fiber-glass, and preferably the material will be vacuum molded in colors to match the manufacturer's paint code. The material gauge in the finished product is preferably approximately one quarter of an inch thick.

The external shape and size of the liner 20 is made as closely as possible complementary to the inner surface 14 of the truck body of the particular pickup truck on which it is to be used, plus outwardly extending flanges 40 to overlie the top edges of the pickup truck body, side walls and tail-gate 16, and the liner 20 is an integral self-contained one piece unit. The liner 20 consists of a bed bottom 22 to which is integrally connected a front wall 24, side walls 26 and a tailgate panel portion 28 integrally connected by a thin web hinge 30. To facilitate loading or unloading, as well as to cushion the load, a number of ridges 32 are provided parallel to the side walls 26 and of course parallel to each other. The bottom surface of bed bottom 22 is made complementary to the top surface of the truck top surface, flat if the truck surface is flat, or ridged if the truck surface is ridged.

Wheel wells 34 are provided in the liner side walls 26 and intersecting bed bottom surface 22. A gasoline tank filler pipe recess 36 is provided complementary to the gasoline tank truck filler pipe. The inner surface of tailgate panel portion 28 is provided with an upstanding or raised frame 38 to provide extra cushioning effect against any article that may be carried on the truck close to the tailgate 16. In addition, the front wall 24, the side walls 26 and the tailgate panel portion 28 are each provided with a flange 40 to overlie the top edges of the truck front and side walls and tailgate.

OPERATION OF THE INVENTION

In operation, the pickup truck is often used now as a combination work horse and pleasure vehicle. To use this liner 20, it is installed by lowering it into the truck bed 14 with the tailgate 16 in open position, over the wheel wells 19 and pushed forward, if necessary, to fit snugly in the truck body 14 with its flanges 40 overlying the top edges of the truck side walls, front wall and tailgate 16. To remove the liner 20 when desired, it is first lifted up somewhat at the front end and, with the truck tailgate open. It is slid slightly back and then removed easily.

ABSTRACT OF THE DRAWINGS

In the drawings, like numbers refer to like parts, and for the purposes of explication, marshaled below are the numbered parts of the improved Pickup Truck Bed Liner and Protector of this invention:

- 10   Conventional pickup truck
- 12   Cab
- 14   Truck body portion of pickup truck
- 16   Truck tailgate
- 18   Wheels
- 19   Truck wheel fenders
- 20   Liner or protector of this invention
- 22   Liner bed bottom
- 24   Front wall
- 26   Side walls
- 28   Tailgate panel portion
- 30   Hinging web 32 Parallel upstanding ridges on 22
34 Wheel wells
36 Gasoline filler pipe recess
38 Raised upstanding rib frame on tailgate portion 28
40 Outwardly extending flange on walls and tailgate panel Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. For use as a liner (20) to protect the bed of a conventional pickup truck (10), the improvement comprising a readily removable and replaceable one piece molded self-contained somewhat rigid liner (20) of inherently cushioning material integrally contoured complementary to the truck bed, tailgate (16) and the front and side walls of the pickup truck body (14), an integral outwardly extending flange portion (40) at the top of said liner front (24) and side wall portions (26) to extend over and protect the top edges of the truck front and side walls and a rearwardly extending tailgate panel portion (28) integrally hinged (30) to the liner bed bottom portion (22) complementary to the pickup truck tailgate (16), hinging means (30) integrally connecting said tailgate panel portion (28) to the liner bed bottom portion (22) comprising a thin web integrally extending between the bed bottom portion and said tailgate panel portion, said hinged tailgate panel portion (28) having an outwardly upstanding flange portion (40) to overlie the top edge of the truck tailgate (16).

2. The liner of claim 1, said liner bed portion (22) having a plurality of longitudinally spaced apart upstanding ribs parallel to the liner integrally upstanding side wall portions 26, and an integral upstanding cushioning frame rib (38) on said tailgate hinged panel portion (28).

3. The liner of claim 2, said liner having wheel wells (34) and being also contoured complementary to the wheel wells of the truck body (14).

4. The liner of claim 1, said liner having wheel wells (34) and being also contoured complementary to the wheel wells of the truck body (14).

* * * * *